Patented Feb. 25, 1936

2,031,944

UNITED STATES PATENT OFFICE 2,031,944

RUBBER COMPOSITION CONTAINING PETROLEUM RESINS

Per K. Frolich, Roselle, N. J., assignor to Standard Oil Development Company, a corporation of Delaware No Drawing. Application September 2, 1932,
Serial No. 631,494

11 Claims. (Cl. 106—23)

This invention relates to new and improved rubber compositions and more especially to the use of resins of petroleum origin in the compounding of rubber.

The preferred resins employed herein have a hydrocarbon character and are therefore unsaponifiable and of great stability generally. These resins are derived from the tarry decomposition products obtained on subjecting petroleum oils to decomposition temperatures at elevated pressures.

In the thermal decomposition or cracking of hydrocarbon oils there is usually produced as a residual byproduct a dark viscous mass known as cracking coil tar. This tar contains resins which may be extracted by suitable means. It also contains heavy difficultly volatile oils which may be used for the production of improved resins. The tar also contains asphaltenes which may be converted into resins by hydrogenation. The resins obtained by these and other similar methods may be suitably called synthetic petroleum resins, as they are produced from petroleum oils which, before treatment, contain substantially no resins. These resins are substantially free from asphaltic matter and therefore possess none of the undesirable qualities imparted to ordinary petroleum residues by these substances.

It has now been found that these petroleum resins are especially suitable for use as softeners in rubber compositions. Pronounced softening action may be obtained by using seven parts by weight of synthetic petroleum resin per hundred parts of rubber. A rubber composition without a softener required seven minutes on the mill before calendering. With the usual paraffin oil as softener three minutes were required for milling, and with a synthetic petroleum resin an almost instantaneous softening effect was secured and the time of milling was correspondingly reduced. The product containing the synthetic petroleum resin does not show discoloration, has no objectionable odor and ages well. This resin is superior to paraffin oil from the softening standpoint. It is as good as coal tar on this point and is superior with regard to color and odor. These resins also have no disadvantageous effect on curing time and are superior in this respect to certain other resins which retard curing.

The use of resin isolated from straight run or cracked petroleum residues has the advantage that such resin may be added to rubber in any desired extent without impairment of the rubber composition by addition of the various other products of a crude or undesirable character normally associated with the resins in such residues.

The synthetic petroleum resins described herein generally have softening points (ball and ring method) between the limits of about 120 and 220° F., although harder or softer resins may be prepared and used according to the desired characteristics of the rubber composition.

The following examples are illustrative of the characteristics of these resins when used in rubber compositions:

Example 1

The following composition suitable for use as a tread stock was prepared:

| | Parts by weight |
|---|---|
| Carbon black | 225 |
| Pale crepe rubber | 475 |
| Stearic acid | 20 |
| Zinc oxide | 5 |
| Captax | 15 |
| Agerite | 5 |
| Sulfur | 25 |

This stock milled up without any trouble and had a very slight tackiness after leaving the mill.

Example 2

A composition similar to that shown in Example 1 but containing in addition 12½ parts by weight of Cumar resins was milled. In the milling this composition exhibited an undesirable characteristic in that the stock stuck very readily to the back roll of the mill.

Example 3

A third composition containing the same ingredients shown in Example 1 but with the addition of 12½ parts by weight of a synthetic petroleum resin was prepared. This stock milled very readily and showed no tendency to adhere to the mill rolls.

The three stocks prepared as above were cured for a period of 30 minutes with a steam pressure of 50 pounds. The samples after curing were allowed to lie 48 hours and were then subjected to tensile strength and elongation tests on a Scott machine and the penetration was determined on a Pusey and Jones plastometer. The results obtained were as follows:

*Tests on samples of rubber feed stocks*

| Stock | Tensile strength lbs./sq. in. | Elongations inches from 1 in. | Penetration mm. |
|---|---|---|---|
| Example 1 | 2,720 | 7.5 | 0.31 |
| | 2,830 | 7.4 | 0.22 |
| | 1,500 | 5.9 | 0.25 |
| Example 2 | 2,810 | 9.1 | 0.30 |
| | 2,830 | 9.4 | 0.30 |
| | 2,780 | | 0.34 |
| Example 3 | 2,890 | 9.7 | 0.34 |
| | 2,700 | 9.6 | 0.33 |
| | 2,540 | 9.2 | 0.30 |

The petroleum resin gave a softer stock than did either of the other two samples.

Synthetic petroleum resins may also be used in preparing rubber stocks for use in footwear, treads and various other applications. Especially desirable softeners may be prepared by melting together a synthetic petroleum resin and a wax acid prepared by oxidation of paraffin wax. These softeners may consist for example of resins and wax acid in proportions of 100 to 5, 100 to 10, 100 to 20, etc., preferably (not necessarily) with the resin the major constituent of the softening agent.

These resins of petroleum origin have a reddish color and are also useful as a pigment. They may be used in at least partial substitution for iron oxide in red rubber compounding, thereby decreasing or avoiding the poor ageing results of the iron oxide.

The synthetic petroleum resins obtained directly by cracking of hydrocarbon oils are preferably prepared from oils which are substantially free of resins but which by subjection, preferably repeatedly, under elevated temperatures and especially at high pressures are converted in part into resinous bodies. These resinous substances can then be concentrated by distillation into a tarry substance which contains the resin admixed with asphalt substances and some heavy oily material.

Several methods for obtaining, from petroleum, resin suitable for my invention will now be described, but my invention is not to be limited to the use of these particular resins. A method of preparing resins by a selective solvent extraction of the residue formed by cracking a non-resin-containing oil after removal of oily components of the residue is described in the copending application Ser. No. 572,059, filed October 30, 1931, by Stewart C. Fulton. This method is illustrated by the following example:

Example 4

1000 gallons of cracking coil tar, gravity 10° A. P. I. were obtained in cracking a distillate gas oil, distilled under vacuum to a still temperature of 660° F. leaving 1334 pounds of bottoms, softening point 225° F. (ball and ring method). The bottoms were taken up in 508 gallons of kerosene distillate or other volatile petroleum naphtha solvent of high flash point such as "Varsol" in two hot extractions with agitation (391 gallons for first extraction and 127 gallons for extracting the residue). In this way 1000 pounds of the bottoms were found to be soluble in the "Varsol" leaving 334 pounds of insoluble asphaltenes. 200 pounds of 66° Bé. sulfuric acid were added to the "Varsol" solution with agitation, the agitation being continued for 15 minutes. After settling, the granular sludge was removed by decantation and filtration, and the "Varsol" solution agitated with 80 pounds of an adsorptive clay such as Attapulgus fines for 15 minutes. The "Varsol" solution was then filtered to remove the clay and distilled to separate the "Varsol" from the resin yielding 584 pounds of resin, softening point 193° F. (ball and ring method).

Other suitable solvents having a selective solvent action for resin and for keeping asphaltic bodies out of solution include light gasoline, casinghead naphtha and liquefied propane, or mixtures of liquefied propane and ethane. Likewise naphtha may be charged with propane and/or ethane under high pressures and used for this purpose.

A grade of gas-oil synthetic resin made in the manner described in Example 4 exhibited the following characteristics:

Color _____ Light reddish yellow or reddish brown
Softening point (by the ball and ring determination) _____ 180 to 200° F.
Oil boiling under 350° C. (662° F.) at 1 mm. pressure _____ None
Asphaltenes _____ None
Resin _____ 100%

A gas oil synthetic resin of this character has the very distinct advantages over oil-containing (greasy) resins of high melting point in its freedom from greasiness and from asphalt discoloration. In the preparation of these resins it is advantageous to use a petroleum resin which is substantially completely synthetic such as may be obtained by the heat treatment of a gas oil. If crude oil or its fractions containing what may be termed natural petroleum resins, is used as a source of the latter difficulties may arise in the separation of resin from oil and a very dark colored and soft product of low melting point and likely to be sticky results.

In some cases however, resins of the latter type may be admixed with the synthetic product in desired proportions, or in other cases, especially when very cheap or dark colored rubber compositions are to be prepared, the synthetic resin may be omitted altogether, provided the softening point of the natural resin is within the desired range, with freedom from stickiness at least to such a degree as will not cause objectionable tackiness of the rubber composition or cause it to stick to the rolls during milling.

The natural petroleum resins as a class are very dark in color, generally difficult to free from objectionable odors and frequently, when not completely isolated from undesirable products of the crude, are so sticky that they would not be suitable for use in many rubber compositions. The moderate heat treatment of petroleum oils, for example, at comparatively low pressures and the lower temperatures employed in the earlier history of cracking, yields semi-resinous compositions containing high-boiling oily polymers, while by intensive heat treatment at pressures of several hundred pounds and at temperatures preferably well above 700° F. there can be synthesized hard resins which may be described as "synthetic super-resins of petroleum origin".

Other improved resins of substantially similar characteristics may be synthesized from the high boiling oils and difficultly volatile semi-resins to be found in cracked tars.

A process for preparing a resin from a vacuum distillate, obtained from cracked tar, by treating the tar distillate fractions with chlorine, subsequently removing the chlorine and oily constituents by distillation, and extracting the resin from the distillation residue with a selective solvent, is described in co-pending application Ser. No. 572,058, filed October 30, 1931, by Stewart C. Fulton. This process is illustrated by the following example:

Example 5

1000 pounds of tar distillate from a cracking coil tar (10° A. P. I.) representing the total overhead boiling up to 660° F. at 1 mm. pressure, were chlorinated until the percentage of combined chlorine reached 9.7%. The chlorinated distillate was then heated up to 660° F. in a still provided with a condenser at atmospheric pressure, whereupon most of the chlorine was removed as hydrochloric acid. Then the distillate was subjected to a vacuum distillation under reduced pressure until a temperature corresponding to 660° F. at 1 mm. pressure was reached. 208 pounds of high softening point residue (S. P. 282° F. ball and ring method) were obtained in this way, which were extracted with light naphtha leaving an insoluble residue amounting to 75 pounds. After removal of the naphtha by distillation 133 pounds of light colored resin were obtained having a softening point of 188° F. (ball and ring method).

Still another process for obtaining resins from very difficultly volatile hydrocarbon oils such as those obtained on distillation of cracking coil tar at reduced pressure, which comprises chlorinating the distillate and agitating it with a condensing agent such as aluminum chloride, hydrolyzing the reaction product, separately removing an oily layer, removing oily constituents therefrom by distillation and extracting a resin from the residue of this distillation with a selective solvent, is described in the co-pending application Ser. No. 572,060, filed October 30, 1931, by Stewart C. Fulton and John Kunc. This process is illustrated by the following example:

*Example 6*

1000 pounds of distillate from a cracking oil tar of petroleum origin, boiling between 300° F. and 660° F. under an absolute pressure of 1 mm. mercury, were chlorinated at 80° F., using a cooling system to prevent increase in temperature until the chlorine content became 9.7% by weight. The chlorinated distillate was pumped into a tank equipped with an agitator and sealed by a reflux condenser. 50 pounds of anhydrous aluminum chloride were then added and the mixture agitated for 12 hours at 80°–90° F. After the reaction was complete the reaction mixture was washed with water and the oil and sludge charged to a still. The temperature was brought up to 600° F. at atmospheric pressure, then cooled and vacuum applied. The distillation was continued until the temperature of the bottoms became the equivalent of 660° F. under 1 mm. of mercury. In this way 293 pounds of high boiling condensed product were obtained. The bottoms were extracted with 300 gallons of 86° A. P. I. naphtha, obtaining 221 pounds of resin in solution. After removing the solvent by atmospheric distillation there was obtained 221 pounds of resin having a softening point of 213° F.

A process for the preparation of resins by the hydrogenation of asphaltenes remaining after the removal of resins from cracking coil tars with selective solvents is described in co-pending application Ser. No. 572,228, filed October 30, 1931 by Fulton and Kalichevsky.

The term synthetic hydrocarbon resin of petroleum origin is used in the claims to indicate hydrocarbon resins produced from petroleum oils which were initially free of resins. These resins are soluble in hydrocarbon oils such as light naphthas, gasolines, lubricating oils, etc., linseed oil, China-wood oil and esters such as amyl acetate and benzol. They are insoluble in water, the lower water soluble alcohols and acetone. They are at least partially compatible with nitrocellulose.

The term "rubber" is used for the purpose of this application to include latex, also its vulcanize and semivulcanized form, caoutchouc, whether natural or synthetic, reclaimed rubber, balata, guayule, gutta percha, rubber isomers, rubber hydrochloride, chloroprene, duprene, and like products, whether or not admixed with fillers, pigments, vulcanizing or accelerating agents.

This invention is not to be limited to any theory of the composition of these synthetic petroleum resins nor to their action when used in rubber compositions nor by any examples which are given herein solely for purpose of illustration, but only by the following claims in which I wish to claim all novelty insofar as the prior art permits.

I claim:
1. Method of preparing a rubber composition comprising incorporating rubber and a synthetic hydrocarbon resin of petroleum origin isolated from the thermal decomposition products of petroleum oils and vulcanizing the mixture.
2. A rubber composition comprising rubber and a resin obtained by the cracking of petroleum oil at elevated temperature and pressure.
3. Composition according to claim 2, in which the resin used is soluble in petroleum naphtha.
4. Composition according to claim 2, in which the resin used is isolated from non-resinous constituents of petroleum.
5. Composition according to claim 2, in which the resin is substantially free from asphalt.
6. A rubber composition comprising rubber and a synthetic hydrocarbon resin derived from a tar fraction boiling above 300° F. at 1 mm. pressure and obtained by cracking a gas oil at elevated temperature and pressure, and substantially free from asphalt.
7. A rubber composition comprising rubber and a synthetic hydrocarbon resin extracted from a residual tar produced by cracking a gas oil, and substantially free from asphalt.
8. The method of preparing a rubber composition comprising preparing a mixture containing rubber and a resin obtained by the cracking of petroleum oil at elevated temperature and pressure, and vulcanizing the mixture.
9. Method according to claim 8, in which the softening point of the resin used is between 180° and 200° F.
10. Method according to claim 8, in which the resin used is substantially free from asphalt.
11. Method according to claim 8, in which the resin used has a softening point by the ball and ring method of 120° to 220° F., said resin being used in suitable proportion as a softener.

PER K. FROLICH.